United States Patent
Zhao et al.

(10) Patent No.: US 9,788,246 B2
(45) Date of Patent: Oct. 10, 2017

(54) MEASUREMENT INITIATION METHOD FOR INTER-FREQUENCY/INTER-SYSTEM CELL RESELECTION AND USER EQUIPMENT THEREOF

(71) Applicant: ZTE Corporation, Shenzhen, Guangdong (CN)

(72) Inventors: Lei Zhao, Shenzhen (CN); Tao Wan, Shenzhen (CN); Minggang Gao, Shenzhen (CN); Chao Lei, Shenzhen (CN); Hairong Ma, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 0 days.

(21) Appl. No.: 14/431,905

(22) PCT Filed: Jul. 19, 2013

(86) PCT No.: PCT/CN2013/079742
§ 371 (c)(1),
(2) Date: Mar. 27, 2015

(87) PCT Pub. No.: WO2013/170827
PCT Pub. Date: Nov. 21, 2013

(65) Prior Publication Data
US 2015/0230143 A1   Aug. 13, 2015

(30) Foreign Application Priority Data
Sep. 27, 2012   (CN) .......................... 2012 1 0367127

(51) Int. Cl.
*H04W 4/00* (2009.01)
*H04B 17/00* (2015.01)
(Continued)

(52) U.S. Cl.
CPC ....... *H04W 36/0088* (2013.01); *H04W 24/08* (2013.01); *H04W 24/10* (2013.01);
(Continued)

(58) Field of Classification Search
None
See application file for complete search history.

(56) References Cited

U.S. PATENT DOCUMENTS

2004/0082328 A1 * 4/2004 Japenga ................ H04W 36/30
455/436
2008/0004023 A1   1/2008 Chen
(Continued)

FOREIGN PATENT DOCUMENTS

CN   1794875 A   6/2006
CN   1809187 A   7/2006
(Continued)

OTHER PUBLICATIONS

Supplementary European Search Report in European application No. 13790368.8, mailed on Aug. 27, 2015.
(Continued)

*Primary Examiner* — Edan Orgad
*Assistant Examiner* — Sithu Ko
(74) *Attorney, Agent, or Firm* — Oppedahl Patent Law Firm LLC

(57) ABSTRACT

A measurement initiation method for inter-frequency/inter-system cell reselection and UE thereof are described. A signal quality value of a current serving cell is obtained for many times, and a signal quality value smaller than or equal to a threshold of measurement initiation of a neighboring inter-frequency/inter-system cell is stored storing until L signal quality values are obtained; a mean signal quality value is obtained by calculation according to the obtained L signal quality values, and when the mean signal quality
(Continued)

value is greater than a signal quality reference threshold, UE initiates the measurement of the neighboring inter-frequency/inter-system cell. By using the method and UE, the problem that UE frequently initiates measurement of a neighboring inter-frequency/inter-system cell even when UE does not move or moves a little can be solved, the power of the UE can be saved, and the radiation produced by the UE on a mobile user can be reduced.

16 Claims, 3 Drawing Sheets

(51) Int. Cl.
 *H04W 36/00* (2009.01)
 *H04W 24/08* (2009.01)
 *H04W 36/30* (2009.01)
 *H04W 52/02* (2009.01)
 *H04W 24/10* (2009.01)
(52) U.S. Cl.
 CPC ....... *H04W 36/30* (2013.01); *H04W 52/0254* (2013.01); *Y02B 60/50* (2013.01)

(56) References Cited

U.S. PATENT DOCUMENTS

| | | | | |
|---|---|---|---|---|
| 2009/0088160 A1* | 4/2009 | Pani | ...................... | H04W 36/30 455/436 |
| 2010/0029274 A1* | 2/2010 | Deshpande | .......... | H04J 11/0093 455/435.3 |
| 2010/0208707 A1* | 8/2010 | Hamabe | ................ | H04W 24/10 370/332 |
| 2010/0290435 A1* | 11/2010 | Kazmi | .................. | H04W 36/30 370/332 |
| 2013/0012189 A1 | 1/2013 | Hamabe et al. | | |
| 2013/0188499 A1* | 7/2013 | Mach | ..................... | H04W 48/20 370/252 |
| 2013/0344902 A1* | 12/2013 | Cili | ...................... | H04W 64/006 455/456.6 |
| 2014/0092768 A1 | 4/2014 | Deng et al. | | |
| 2014/0198761 A1* | 7/2014 | Hooli | .................... | H04W 72/08 370/329 |
| 2015/0126199 A1 | 5/2015 | Hamabe | | |

FOREIGN PATENT DOCUMENTS

| | | |
|---|---|---|
| CN | 101064956 A | 10/2007 |
| CN | 101175330 A | 5/2008 |
| CN | 101610521 A | 12/2009 |
| CN | 101810023 A | 8/2010 |
| CN | 102348271 A | 2/2012 |
| CN | 102547941 A | 7/2012 |
| CN | 102572983 | 7/2012 |
| EP | 1947779 A1 | 7/2008 |
| EP | 2699043 A1 | 2/2014 |
| JP | 2007258845 A | 10/2007 |
| JP | 2010531577 A | 9/2010 |
| WO | 2010140053 A1 | 12/2010 |

OTHER PUBLICATIONS

User Equipment (UE) procedures in idle mode and procedures for cell reselection in connected mode (Release10), mailed on Jun. 26, 2012.
International Search Report in international application No. PCT/CN2013/079742, mailed on Oct. 31, 2013.
English Translation of the Written Opinion of the International Search Authority in international application No. PCT/CN2013/079742, mailed on Oct. 31, 2013.

* cited by examiner

MEASUREMENT INITIATION METHOD FOR INTER-FREQUENCY/INTER-SYSTEM CELL RESELECTION AND USER EQUIPMENT THEREOF

TECHNICAL FIELD

The disclosure relates to the measurement technology of cell reselection, and in particular to a measurement initiation method for inter-frequency/inter-system cell reselection and User Equipment (UE) thereof.

BACKGROUND

The 3rd Generation Partnership Project (3GPP) aims to promote a 3G standard based on an evolved Global System for Mobile Communications (GSM) core network; the 3GPP has designed corresponding protocol specifications for different data services in the 3G system, in which a service area designated by a base station is called a cell. With the change of a geographical location of a mobile subscriber, the UE used by the mobile subscriber will move from a current serving cell to a target serving cell. Such serving cell selection made by UE is called cell reselection; the cell reselection aims to make UE reside in an ideal serving cell, so as to ensure the quality of connection.

Usually, before performing cell reselection, UE needs to first measure a signal quality value $S_{rxlev}$ of a current serving cell, and then decide whether to initiate measurement of a neighbouring cell according to the signal quality value $S_{rxlev}$ and a threshold $S_{int\_rasearch}/S_{non\_int\_rasearch}$ of measurement initiation of the neighbouring cell. The step of UE initiating measurement of a neighbouring cell includes that the UE initiates measurement of a neighbouring intra-frequency cell and measurement of a neighbouring inter-frequency/inter-system cell; the measurement of a neighbouring intra-frequency cell needs to compare the signal quality value $S_{rxlev}$ with the threshold $S_{int\_rasearch}$ of measurement initiation of a neighbouring intra-frequency cell; the measurement of the neighbouring inter-frequency/inter-system cell needs to compare the signal quality value $S_{rxlev}$ with the threshold $S_{non\_int\_rasearch}$ of measurement initiation of a neighbouring inter-frequency/inter-system cell. The technology that UE initiates measurement of a neighbouring intra-frequency cell is already quite mature, so how UE initiates measurement of a neighbouring inter-frequency/inter-system cell becomes a current focus of research.

In the related art, when a signal quality value $S_{rxlev}$ of a current serving cell is smaller than or equal to a threshold $S_{non\_int\_rasearch}$ of measurement initiation of a neighbouring inter-frequency/inter-system cell, UE initiates measurement of the neighbouring inter-frequency/inter-system cell, wherein the signal quality value $S_{rxlev}$ is obtained by calculation according to formula (1) and formula (2):

$$S_{rxlev} = Q_{rxlevmeas} - Q_{rxlev\,min} - P_{compensation} \quad (1)$$

$$P_{compensation} = MAX(UE\_TXPWR\_MAX\_RACH - P\_MAX, 0) \quad (2)$$

wherein $Q_{rxlevmeas}$ represents a received power quality value of the current serving cell measured by the UE; $Q_{rexlev\,min}$ represents the minimum received power quality value of the UE required by the current serving cell, and this value is transmitted to the UE through a system broadcast message; P_MAX represents the maximum transmitted power value of the UE; UE_TXPWR_MAX_RACH represents the maximum transmitted power value of the UE allowed to use on a Random Access Channel (RACH); $P_{compensation}$ represents a power compensation quality value needed by the UE when accessing the RACH of the base station to which the current serving cell belongs, and its value is the maximum between UE_TXPWR_MAX_RACH−P_MAX and 0, and this value is transmitted to the UE through a system broadcast message.

In such method of determining whether the UE initiates measurement of a neighbouring inter-frequency/inter-system cell by comparing $S_{rxlev}$ with $S_{non\_int\_rasearch}$, the condition for the UE to initiate the measurement of a neighbouring inter-frequency/inter-system cell is very simple, i.e., only $S_{rxlev} \leq S_{non\_int\_rasearch}$ needs to be satisfied; moreover, the value of $S_{non\_int\_rasearch}$ is not unique, but changes with change of a communication environment. If the value of $S_{non\_int\_rasearch}$ is relatively large, some pieces of UE which actually do not need to initiate the measurement of a neighbouring inter-frequency/inter-system cell will initiate the measurement of a neighbouring inter-frequency/inter-system cell, which causes unreasonable waste of electric power of these pieces of UE.

Different from the above condition for UE to initiate measurement of a neighbouring inter-frequency/inter-system cell, a patent document, which has a title of a cell selecting device and method in a mobile communication terminal and which has an application number of 200510120052, describes a cell selecting method, wherein UE measures an error rate of messages sent from a base station to which a current serving cell belongs, and reselects a serving cell when the measured error rate is greater than a reference value pre-stored in the UE. Such a technical solution takes into account a situation that a wireless transmission channel changes in real time, but does not take into account a situation that a wireless transmission environment in a network has almost no change and a situation that the UE does not move or moves a little.

In practical application, the situation that UE does not move or moves a little often happens, for example, a mobile subscriber often moves within a small space like in the office or at home. However, even if the UE does not move or moves a little, the UE also initiates the measurement of a neighbouring inter-frequency/inter-system cell, because the mobile subscriber always hopes that the UE used by him/her resides in an ideal serving cell with the best signal quality. If the UE does not move or moves a little, it is indicated that the current serving cell is the one where the UE gets the best signal quality, at which moment however, the UE will still initiate the measurement and search of signal quality of a neighbouring inter-frequency/inter-system cell, which is obviously useless, not only wasting electric power of the UE, but also causing more radiation to the mobile subscriber.

SUMMARY

In view of this, the disclosure is mainly intended to provide a measurement initiation method for inter-frequency/inter-system cell reselection and UE thereof, so as to solve the problem in the related art that UE frequently initiates measurement of a neighbouring inter-frequency/inter-system cell even when the UE does not move or moves a little, thereby saving the power of the UE, and reducing the radiation produced by the UE on a mobile user.

To this end, the technical solutions of the disclosure are implemented as follows.

An embodiment of the disclosure provides a measurement initiation method for inter-frequency/inter-system cell reselection, including that:

a signal quality value of a current serving cell is obtained for many times, and a signal quality value smaller than or equal to a threshold of measurement initiation of a neighbouring inter-frequency/inter-system cell is stored until L signal quality values are obtained;

a mean signal quality value is obtained by calculation according to the obtained L signal quality values, and when the mean signal quality value is greater than a signal quality reference threshold, UE initiates the measurement of the neighbouring inter-frequency/inter-system cell.

In the above solution, the step of obtaining the signal quality value of the current serving cell may include that:

a received power quality value of the UE is measured;

the signal quality value of the current serving cell obtained by calculation according to the received power quality value.

In the above solution, before obtaining the signal quality value of the current serving cell for many times, the method may further include that the threshold of measurement initiation of a neighbouring inter-frequency/inter-system cell and the signal quality reference threshold are obtained through a system broadcast message sent by a network side.

In the above solution, the method may further include that the UE reselects a serving cell according to a measurement result.

Another embodiment of the disclosure provides UE, including a processing module and a control module; wherein, the processing module is configured to obtain the signal quality value of the current serving cell for many times, and to store the signal quality value smaller than or equal to the threshold of measurement initiation of a neighbouring inter-frequency/inter-system cell until obtaining L signal quality values; and the control module is configured to calculate to obtain a mean signal quality value according to the obtained L signal quality values, and to initiate the measurement of the neighbouring inter-frequency/inter-system cell when the mean signal quality value is greater than a signal quality reference threshold.

In the above solution, the control module may be further configured to control the UE to reselect a serving cell according to a measurement result.

In the above solution, the processing module may include an obtaining sub-module and a storing sub-module; wherein, the obtaining sub-module is configured to obtain the signal quality value of the current serving cell, and to determine whether the L signal quality values have been stored; and the storing sub-module is configured to store the threshold of measurement initiation of a neighbouring inter-frequency/inter-system cell and the signal quality reference threshold, and to store the signal quality value smaller than or equal to the threshold of measurement initiation of a neighbouring inter-frequency/inter-system cell.

In the above solution, the control module may include a comparison sub-module and a cell measurement initiation sub-module; wherein, the comparison sub-module is configured to calculate to obtain the mean signal quality value according to the obtained L signal quality values, and to compare the mean signal quality value with the signal quality reference threshold; and the cell measurement initiation sub-module is configured to initiate the measurement of the neighbouring inter-frequency/inter-system cell when the mean signal quality value is greater than the signal quality reference threshold.

In the above solution, the control module may further include a cell reselection sub-module, which is configured to reselect the serving cell according to the measurement result.

In the above solution, the processing module may be further configured to obtain the threshold of measurement initiation of a neighbouring inter-frequency/inter-system cell and the signal quality reference threshold.

In the measurement initiation method for inter-frequency/inter-system cell reselection and UE thereof provided by the embodiments, a signal quality value of a current serving cell is obtained for many times, and a signal quality value smaller than or equal to the threshold of measurement initiation of a neighbouring inter-frequency/inter-system cell is stored until L signal quality values are obtained; a mean signal quality value is obtained by calculation according to the obtained L signal quality values, and when the mean signal quality value is greater than the signal quality reference threshold, the UE initiates the measurement of the neighbouring inter-frequency/inter-system cell. The embodiments add a condition for UE to initiate measurement of a neighbouring inter-frequency/inter-system cell, reduce the frequency that the UE initiates measurement and search of the neighbouring inter-frequency/inter-system cell, and reduce the power consumption of the UE, thereby especially ensuring the battery life of UE which is in a cell with relatively poor service quality and cannot find a proper neighbouring cell to switch. Furthermore, the embodiments can determine whether to initiate measurement of a neighbouring inter-frequency/inter-system cell by only depending on a variable quantity of a signal quality value of a current serving cell, which reduces the burden of managing communication system resources.

DETAILED DESCRIPTION

The embodiments are further elaborated below in combination with the accompanying drawings.

Figure 1:
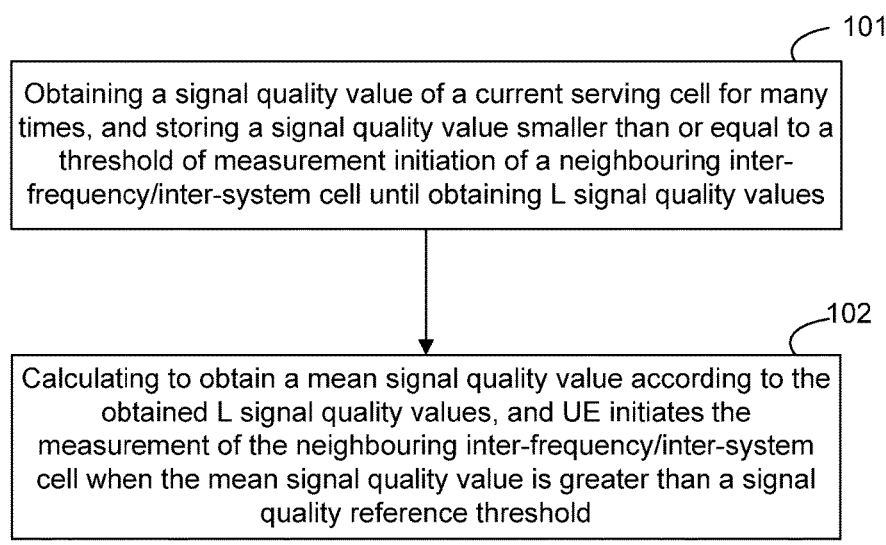
FIG. 1 is a flowchart of a measurement initiation method for inter-frequency/inter-system cell reselection in an embodiment of the disclosure.

FIG. 1 is a flowchart of a measurement initiation method for inter-frequency/inter-system cell reselection in an embodiment of the disclosure; as shown in FIG. 1, the method includes the following steps.

Step 101 includes that a signal quality value of a current serving cell is obtained for many times, and a signal quality value smaller than or equal to a threshold of measurement initiation of a neighbouring inter-frequency/inter-system cell is stored until L signal quality values are obtained;

here, an array storing signal quality values is preset in UE; the length of the array is L, and L is any positive integer.

Correspondingly, the UE measures a received power quality value $Q_{rxlevmeas}$ of the current serving cell, and the UE receives, through a system broadcast message, the minimum received power quality value $Q_{rxlev\ min}$ of the UE required by the current serving cell and a power compensation quality value $P_{compensation}$ needed by the UE when the UE accesses an RACH of a base station to which the current serving cell belongs, and the UE calculates according to formula (1) and formula (2) to obtain a signal quality value $S_{rxlev}$, and stores a signal quality value $S_{rxlev}$ smaller than or equal to a threshold $S_{non\_int\ rasearch}$ of measurement initiation of a neighbouring inter-frequency/inter-system cell into the array which is set in the UE until the array whose length is L in the UE is full, and then L signal quality values are obtained.

Step 102 includes that a mean signal quality value is obtained by calculation according to the obtained L signal quality values, and when the mean signal quality value is greater than a signal quality reference threshold, UE initiates the measurement of the neighbouring inter-frequency/inter-system cell.

Preferably, the UE can reselect a serving cell according to a measurement result.

In the embodiment, both the threshold $S_{non\_int\ rasearch}$ of measurement initiation of a neighbouring inter-frequency/inter-system cell and the signal quality reference threshold $S_{thresh}$ are transmitted from a network side to the UE through a system broadcast message; both the $S_{non\_int\ rasearch}$ and the $S_{thresh}$ are parameters configured on the network side, and are obtained by network optimization; the network optimization is referred to continuously planning and debugging a communication network according to an actual wireless transmission environment so as to obtain a good communication network transmission environment.

Figure 2:
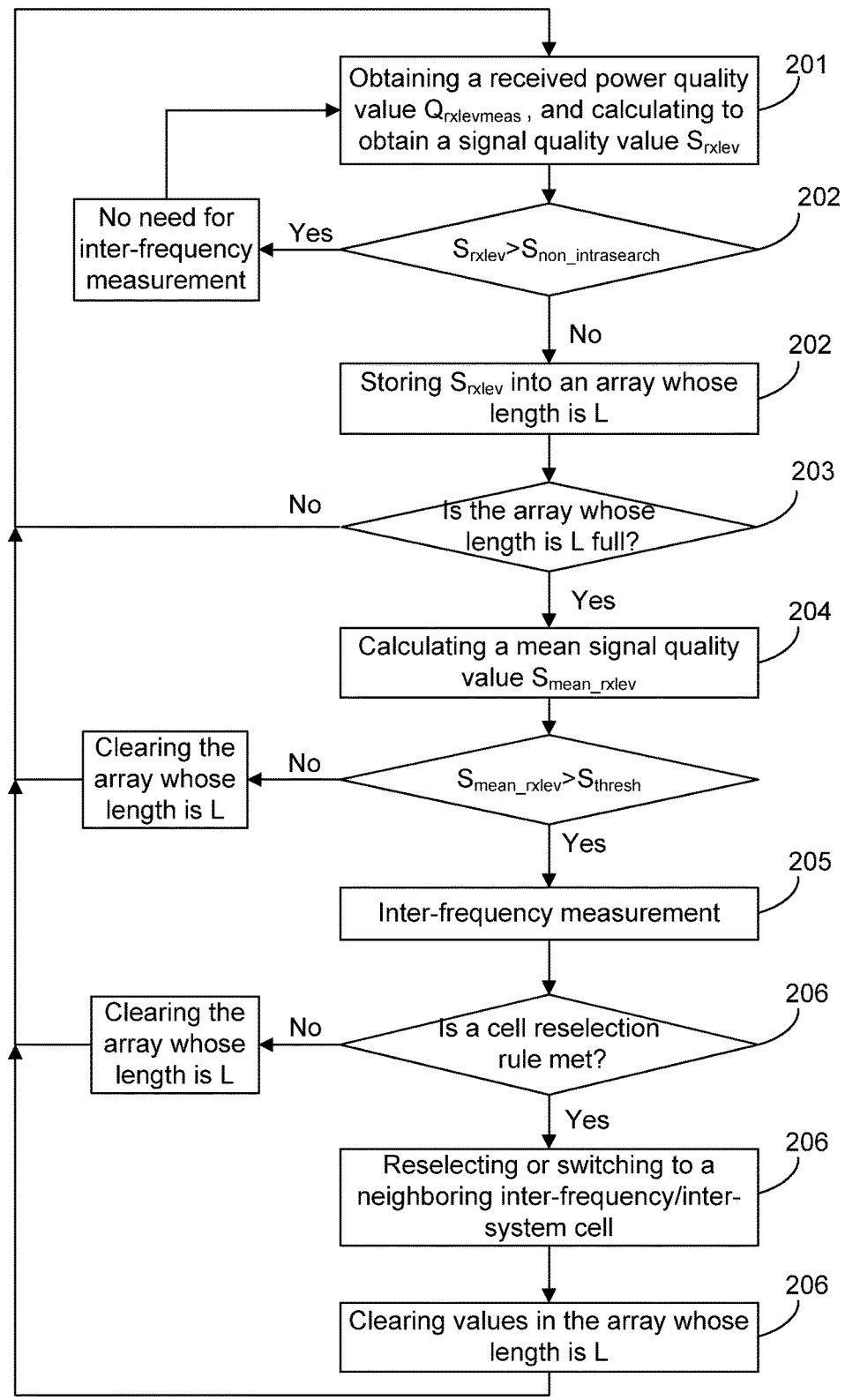
FIG. 2 is a flowchart of implementing the measurement initiation method for inter-frequency/inter-system cell reselection in an embodiment of the disclosure.

FIG. 2 is a flowchart of implementing the measurement initiation method for inter-frequency/inter-system cell reselection in an embodiment of the disclosure; in the present embodiment, a mobile communication system may mainly include UE on a terminal side and a network side; as shown in FIG. 2, the method includes the following steps.

Step 201 includes that the UE obtains a threshold of measurement initiation of a neighbouring inter-frequency/inter-system cell and a signal quality reference threshold, measures a received power quality value $Q_{rxlevmeas}$ of a current serving cell, receives the minimum received power quality value $Q_{rexlev\ min}$ and a power compensation quality value $P_{compensation}$, and calculates according to formula (1) and formula (2) to obtain a signal quality value $S_{rxlev}$ of the current serving cell.

The minimum received power quality value $Q_{rexlev\ min}$ of the UE required by the current serving cell and the power compensation quality value $P_{compensation}$ needed by the UE when accessing a RACH of a base station to which the current serving cell belongs are transmitted to the UE through a system broadcast message.

Step 202 includes that the UE compares the signal quality value $S_{rxlev}$ of the current serving cell obtained by calculation with the $S_{non\_int\ rasearch}$ of measurement initiation of the neighbouring cell, and stores the $S_{rxlev}$ smaller than or equal to the $S_{non\_int\ rasearch}$.

In the present embodiment, the array whose length is L is preset in the UE for storing the signal quality value $S_{rxlev}$ smaller than the $S_{non\_int\ rasearch}$.

When the $S_{rxlev}$ is greater than the $S_{non\_int\ rasearch}$, there is no need to store the $S_{rxlev}$ into the array which is set in the UE, at which moment the service quality of the current serving cell is determined good enough, and the UE does not need to initiate the measurement of the neighbouring inter-frequency/inter-system cell; then step 201 is executed;

when the $S_{rxlev}$ is smaller than or equal to the $S_{non\_int\ rasearch}$, the $S_{rxlev}$ is stored into the array, and then Step 203 is executed.

Step 203 includes that step 201 and step 202 are executed repeatedly, until the array whose length is L is full, and then step 204 is executed.

Step 204 includes that the L signal quality values $S_{rxlev}$ stored in the array are calculated according to formula (3), so as to obtain a mean signal quality value $S_{mean\_rxlev}$.

$$S_{mean\_rxlev} = \left| \sum_{i=1}^{i=L} S[i] - S[i-1] \right| \div (L-1) \quad (3)$$

Step 205 includes that the UE compares the mean signal quality value $S_{mean\_rxlev}$ obtained by calculation with the signal quality reference threshold $S_{thresh}$.

Specifically, when the $S_{mean\_rxlev}$ is smaller than the $S_{thresh}$, it is indicated that a signal quality variable quantity of the current serving cell does not exceed the signal quality reference threshold $S_{thresh}$, that the current wireless transmission environment has almost no change, or that the UE does not move or moves a little, the current serving cell is the one with the best signal quality, and that the UE does not need to initiate the measurement of the neighbouring inter-frequency/inter-system cell; then step 201 is executed.

When the $S_{mean\_rxlev}$ is greater than the $S_{thresh}$, it is indicated that the signal quality variable quantity of the current serving cell exceeds the signal quality reference threshold $S_{thresh}$, that the current wireless transmission environment changes, or that the UE has relatively large movement, and that the UE will initiate the measurement of the neighbouring inter-frequency/inter-system cell; step 206 is then executed.

Step 206 includes that whether the measurement result of the neighbouring inter-frequency/inter-system cell in step 205 meets a cell reselection rule is determined.

In the present embodiment, a measurement quantity included in the measurement result is prescribed by the 3GPP communication protocol standards. The measurement quantity may include the residence time of the UE in the current serving cell, the received power quality value $Q_{rxlevmeas}$ of the current serving cell, hysteresis $Q_{hyst}$ of the current serving cell, the received power quality value $Q_{rxlevmeas}$ of the neighbouring inter-frequency/inter-system cell, and an offset $Q_{offset}$ of the current serving cell relative to the neighbouring inter-frequency/inter-system cell. When the residence time of the UE in the current serving cell exceeds the $T_{reselection}$, and the sum of the $Q_{rxlevmeas}$ and the $Q_{hyst}$ of the current serving cell is smaller than the difference between the $Q_{rxlevmeas}$ and the $Q_{offset}$ the neighbouring inter-frequency/inter-system cell, and lasts for $T_{reselection}$, it is determined that the cell reselection rule is met, and switch from the current serving cell to the neighbouring inter-frequency/inter-system cell is allowed, at the same time, all values in the array whose length is L are cleared. When the measurement result does not meet the cell reselection rule, all values in the array whose length is L are cleared as well, and step 201 is the executed to continue making determination.

$T_{reselection}$ is the length of time of evaluating the quality of the neighbouring inter-frequency/inter-system cell and the current serving cell during cell reselection. Both the cell reselection rule and the determination about whether the measurement result meets the cell reselection rule refer to the 3GPP communication protocol standards.

Figure 3:
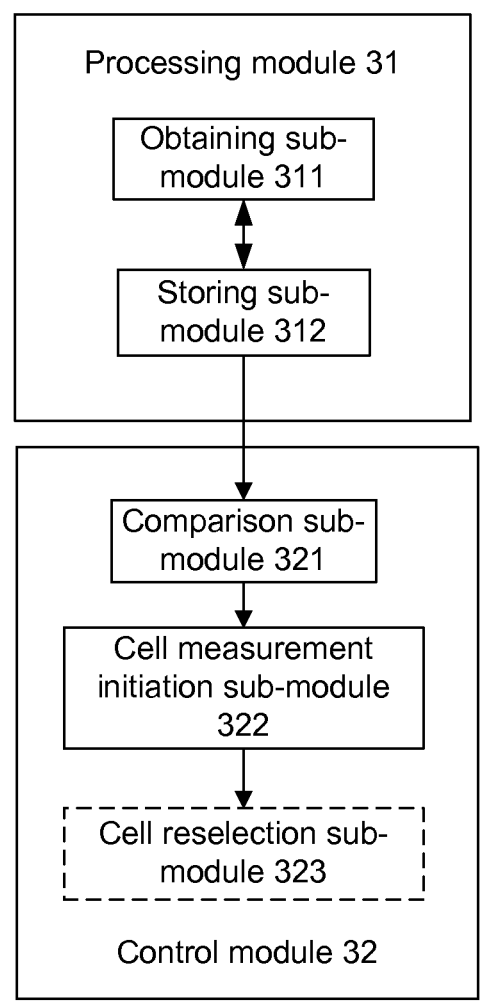
FIG. 3 is a structural diagram of UE in an embodiment of the disclosure.

For implementing the above method, another embodiment of the disclosure provides UE; as shown in FIG. 3, the UE includes a processing module 31 and a control module 32; wherein, the processing module 31 is configured to obtain a signal quality value of a current serving cell for many times, and to store a signal quality value smaller than or equal to a threshold of measurement initiation of a neighbouring inter-frequency/inter-system cell until obtaining L signal quality values;

the control module 32 is configured to calculate to obtain a mean signal quality value according to the obtained L signal quality values, and to initiate the measurement of the neighbouring inter-frequency/inter-system cell when the mean signal quality value is greater than a signal quality reference threshold.

Preferably, the control module 32 is further configured to control the UE to reselect a serving cell according to a measurement result.

The processing module 31 is further configured to obtain the threshold of measurement initiation of a neighbouring inter-frequency/inter-system cell and the signal quality reference threshold.

The processing module 31 may include an obtaining sub-module 311 and a storing sub-module 312; wherein, the obtaining sub-module 311 is configured to obtain the signal quality value of the current serving cell, and to determine whether the L signal quality values have been stored;

here, obtaining the signal quality value of the current serving cell is: obtaining the signal quality value of the current serving cell according to the measured received power quality value.

The storing sub-module 312 is configured to store the threshold of measurement initiation of a neighbouring inter-frequency/inter-system cell and the signal quality reference threshold, and to store the signal quality value smaller than or equal to the threshold of measurement initiation of a neighbouring inter-frequency/inter-system cell.

Preferably, the control module 32 may include a comparison sub-module 321 and a cell measurement initiation sub-module 322; wherein, the comparison sub-module 321 is configured to, according to the obtained L signal quality values, calculate to obtain the mean signal quality value, and to compare the mean signal quality value with the signal quality reference threshold;

the cell measurement initiation sub-module 322 is configured to, when the mean signal quality value is greater than the signal quality reference threshold, initiate the measurement of the neighbouring inter-frequency/inter-system cell.

Preferably, the control module 32 may further include a cell reselection sub-module 323, which is configured to reselect the serving cell according to the measurement result.

Specifically, the UE receives the threshold $S_{non\_int\ rasearch}$ of measurement initiation of a neighbouring inter-frequency/inter-system cell and the signal quality reference threshold $S_{thresh}$ from the network side, and stores them in the storing sub-module 312. The storing sub-module 312 is set with a array whose length is L; the obtaining sub-module 311 calculates, according to formula (1) and formula (2) in the above method, the current received power quality value $Q_{rxlevmeas}$ measured by the UE to obtain the current signal quality value $S_{rxlev}$; then, the obtaining sub-module 311 compares the current signal quality value $S_{rxlev}$ obtained by calculation with the threshold $S_{non\_int\ rasearch}$ of measurement initiation of the neighbouring cell; when the current $S_{rxlrev}$ is smaller than or equal to the $S_{non\_int\ rasearch}$, then the current signal quality value $S_{rxlev}$ is stored into the array whose length is L; the obtaining sub-module 311 determines whether the array is full; when the array is not full, namely the number of the signal quality values $S_{rxlev}$ stored in the array does not reach L, then the obtaining sub-module 311 performs the above mentioned calculation, comparison and storing in sequence, until the array becomes full.

After the array is full, the comparison sub-module 321 calculates the L signal quality values $S_{rxlev}$ stored in the array according to formula (3) so as to obtain the mean signal quality value $S_{mean\_rxlev}$, and compares the $S_{mean\_rxlev}$ with the signal quality reference threshold $S_{thresh}$ stored in the storing sub-module 312; when the $S_{mean\_rxlev}$ is greater than the $S_{thresh}$, the cell measurement initiation sub-module 322 informs the UE to initiate the measurement of the neighbouring inter-frequency/inter-system cell, and the UE measures the neighbouring inter-frequency/inter-system cell.

Preferably, the cell reselection sub-module 323 determines whether the measurement result obtained by the UE meets the cell reselection rule. When the measurement result meets the cell reselection rule, the cell reselection sub-module 323 reselects a serving cell. Both the measurement quantity included in the measurement result and the cell reselection rule satisfy the 3GPP communication protocol standards.

Besides 3G, the technical solutions provided in the disclosure may also be applied to the 2nd Generation (2G) digital communication technology and the 4th Generation (4G) digital communication technology.

To sum up, the embodiments of the disclosure provide a measurement initiation method for inter-frequency/inter-system cell reselection and UE thereof, by which a signal quality value of a current serving cell is obtained for many times, and a signal quality value smaller than or equal to the threshold of measurement initiation of a neighbouring inter-frequency/inter-system cell is stored until L signal quality values are obtained; the mean signal quality value is obtained by calculation according to the obtained L signal quality values, and when the mean signal quality value is greater than the signal quality reference threshold, the UE initiates the measurement of the neighbouring inter-frequency/inter-system cell. When the measured signal quality value is greater than the threshold of measurement initiation of a neighbouring cell or the mean signal quality value is smaller than the signal quality reference threshold, the UE does not initiate the measurement of the neighbouring inter-frequency/inter-system cell; only when both the condition that the measured signal quality value is smaller than the threshold of measurement initiation of a neighbouring cell and the condition that the mean signal quality value is greater than the signal quality reference threshold are met, the UE initiates the measurement of the neighbouring inter-frequency/inter-system cell. By using the technical solutions of the disclosure, the frequency that the UE frequently initiates measurement and search of a neighbouring cell is reduced, and the power of the UE is fundamentally saved.

The above are only embodiments and not intended to limit the scope of claims.

What is claimed is:

1. A measurement initiation method for inter-frequency or inter-system cell reselection, comprising:
   obtaining a signal quality value of a current serving cell for many times, and storing the signal quality value which is smaller than or equal to a threshold of measurement initiation of a neighbouring inter-frequency or inter-system cell into an array until obtaining L signal quality values;

calculating to obtain a mean signal quality value according to the obtained L signal quality values, wherein the L signal quality values $S_{rxlev}$ stored in the array are calculated according to formula $$S_{mean\_rxlev} = \left| \sum_{i=1}^{i=L} S[i] - S[i-1] \right| \div (L-1),$$

so as to obtain the mean signal quality value $S_{mean\_rxlev}$, and when the mean signal quality value is greater than a signal quality reference threshold, initiating, by User Equipment (UE), the measurement of the neighbouring inter-frequency or inter-system cell.

2. The measurement initiation method for inter-frequency or inter-system cell reselection according to claim 1, wherein obtaining the signal quality value of the current serving cell comprises:
   measuring a received power quality value of the UE;
   calculating to obtain the signal quality value of the current serving cell according to the received power quality value.

3. The measurement initiation method for inter-frequency or inter-system cell reselection according to claim 1, further comprising: obtaining, through a system broadcast message sent by a network side, the threshold of measurement initiation of a neighbouring inter-frequency or inter-system cell and the signal quality reference threshold, before obtaining the signal quality value of the current serving cell for many times.

4. The measurement initiation method for inter-frequency or inter-system cell reselection according to claim 1, further comprising: reselecting, by the UE, a serving cell according to a measurement result.

5. User Equipment (UE) comprising a processor; wherein, the processor is configured to be capable of executing programming instructions stored in a memory to perform steps comprising:
   obtaining a signal quality value of a current serving cell for many times, storing the signal quality value which is smaller than or equal to a threshold of measurement initiation of a neighbouring inter-frequency or inter-system cell into an array until obtaining L signal quality values; and
   calculating to obtain a mean signal quality value according to the obtained L signal quality values, wherein the L signal quality values $S^{rxlev}$ stored in the array are calculated according to formula $$S_{mean\_rxlev} = \left| \sum_{i=1}^{i=L} S[i] - S[i-1] \right| \div (L-1),$$

so as to obtain the mean signal quality value $S_{mean\_rxlev}$, and initiating the measurement of the neighbouring inter-frequency or inter-system cell when the mean signal quality value is greater than a signal quality reference threshold.

6. The UE according to claim 5, wherein the processor is further configured to be capable of executing programming instructions stored in the memory to perform steps further comprising:
controlling the UE to reselect a serving cell according to a measurement result.

7. The UE according to claim 5, wherein the processor is configured to be capable of executing programming instructions stored in a memory to perform steps comprising:
   obtaining the signal quality value of the current serving cell, and determining whether the L signal quality values have been stored;
   storing the threshold of measurement initiation of a neighbouring inter-frequency or inter-system cell and the signal quality reference threshold, and storing the signal quality value smaller than or equal to the threshold of measurement initiation of a neighbouring inter-frequency or inter-system cell.

8. The UE according to claim 7, wherein the processor is configured to be capable of executing programming instructions stored in a memory to perform steps comprising:
   calculating to obtain the mean signal quality value according to the obtained L signal quality values, and comparing the mean signal quality value with the signal quality reference threshold; and
   initiating the measurement of the neighbouring inter-frequency or inter-system cell when the mean signal quality value is greater than the signal quality reference threshold.

9. The UE according to claim 8, wherein the processor is further configured to be capable of executing programming instructions stored in the memory to perform steps further comprising:
   reselecting the serving cell according to the measurement result.

10. The UE according to claim 5, wherein the processor is further configured to be capable of executing programming instructions stored in the memory to perform steps further comprising:
    obtaining the threshold of measurement initiation of a neighbouring inter-frequency or inter-system cell and the signal quality reference threshold.

11. The measurement initiation method for inter-frequency or inter-system cell reselection according to claim 2, further comprising: reselecting, by the UE, a serving cell according to a measurement result.

12. The measurement initiation method for inter-frequency or inter-system cell reselection according to claim 3, further comprising: reselecting, by the UE, a serving cell according to a measurement result.

13. The UE according to claim 6, wherein the processor is configured to be capable of executing programming instructions stored in the memory to perform steps comprising:
    obtaining the signal quality value of the current serving cell, and determining whether the L signal quality values have been stored;
    storing the threshold of measurement initiation of a neighbouring inter-frequency or inter-system cell and the signal quality reference threshold; and storing the signal quality value smaller than or equal to the threshold of measurement initiation of a neighbouring inter-frequency or inter-system cell.

14. The UE according to claim 13, wherein the processor is configured to be capable of executing programming instructions stored in the memory to perform steps comprising:
    calculating to obtain the mean signal quality value according to the obtained L signal quality values, and comparing the mean signal quality value with the signal quality reference threshold; and initiating the measurement of the neighbouring inter-frequency or inter-system cell when the mean signal quality value is greater than the signal quality reference threshold.

15. The UE according to claim 14, wherein the processor is further configured to be capable of executing programming instructions stored in the memory to perform steps further comprising:

reselecting the serving cell according to the measurement result.

16. The UE according to claim 6, wherein the processor is further configured to be capable of executing programming instructions stored in the memory to perform steps further comprising:

obtaining the threshold of measurement initiation of a neighbouring inter-frequency or inter-system cell and the signal quality reference threshold.

\* \* \* \* \*